Aug. 2, 1966 B. H. IRWIN ETAL 3,263,772
SOUND ATTENUATING GAS CONDUIT WITH ONE-QUARTER WAVE-LENGTH
SIDE BRANCH CHAMBERS
Filed June 17, 1964 4 Sheets-Sheet 3

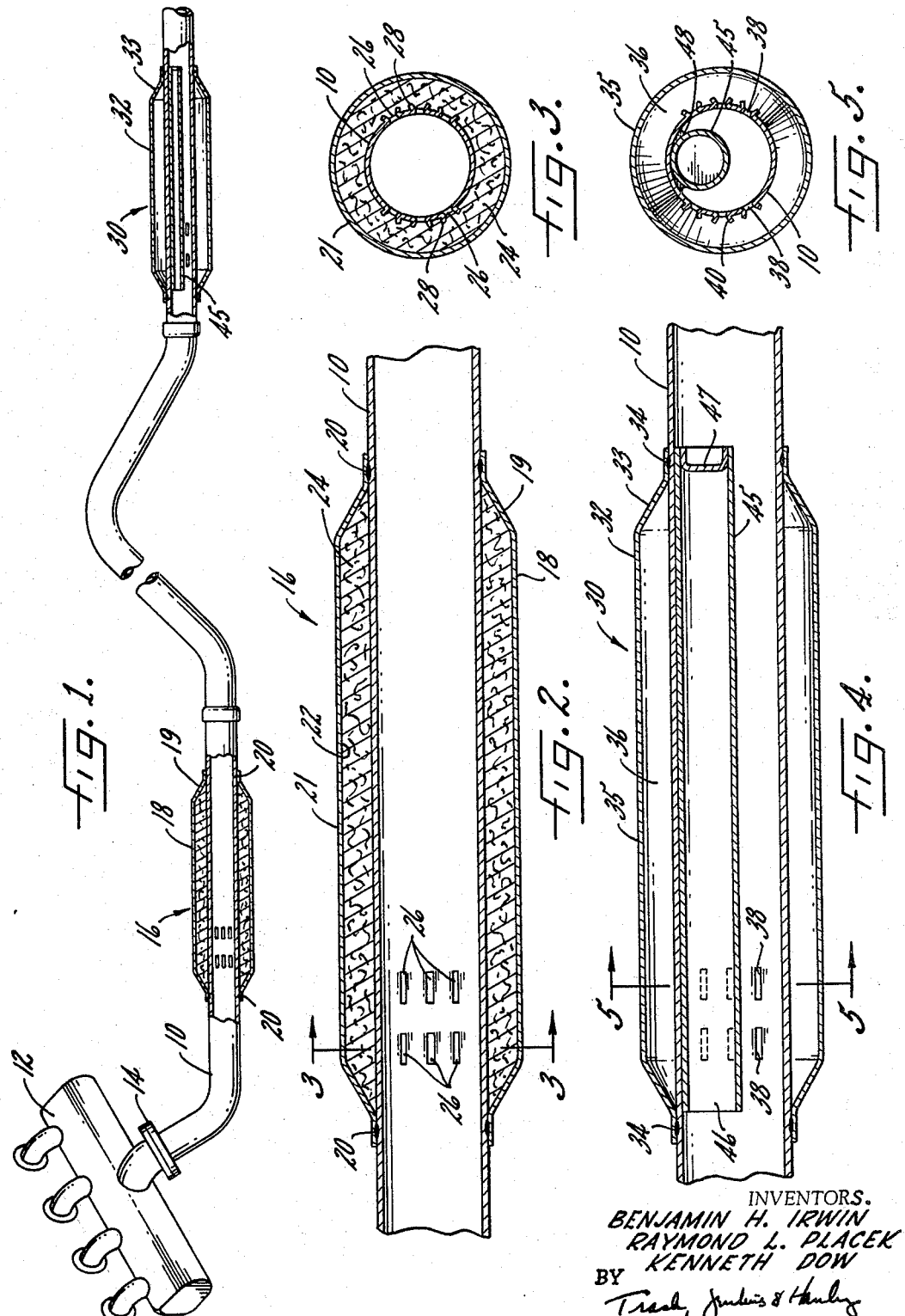

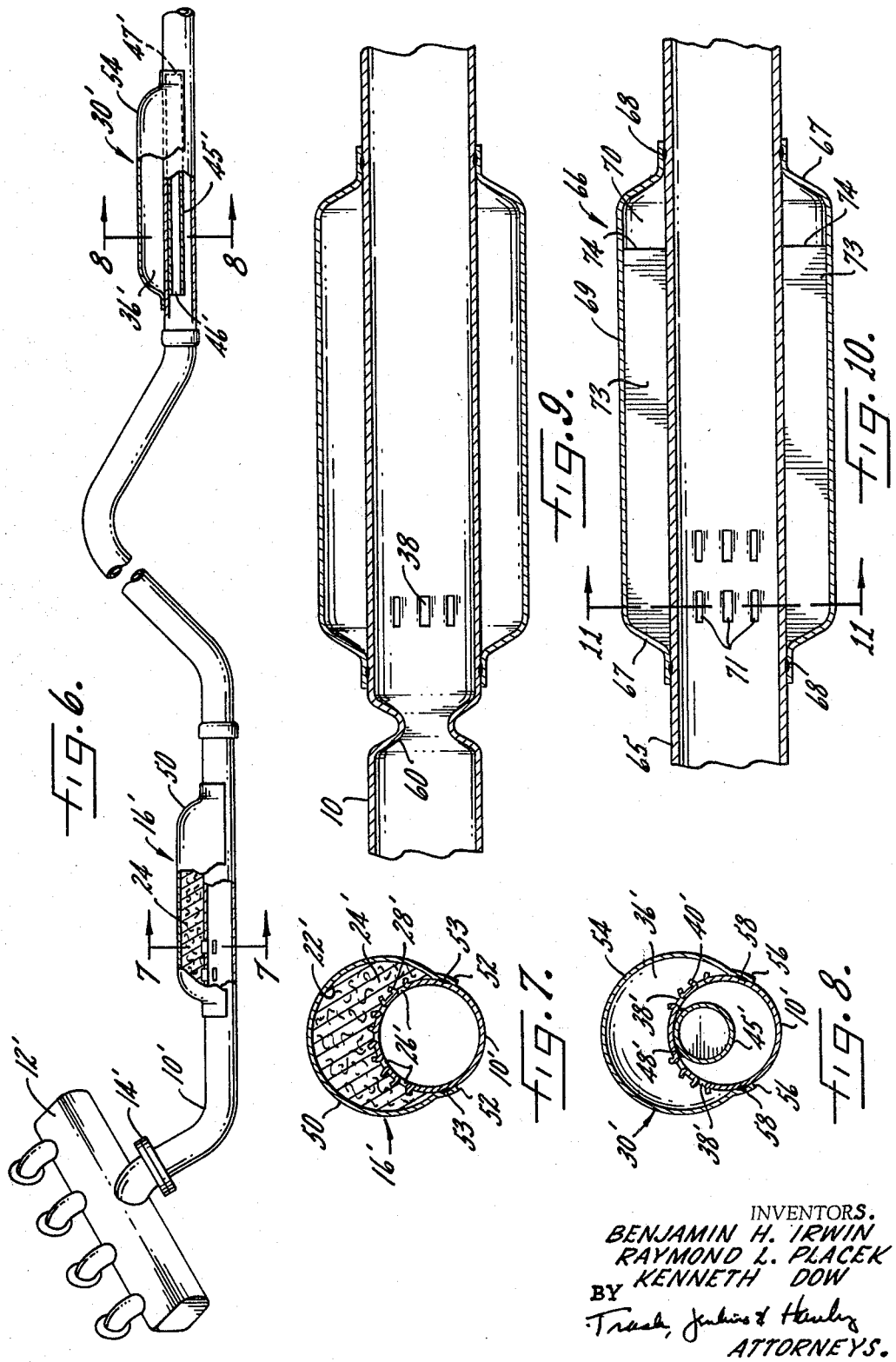

INVENTORS.
BENJAMIN H. IRWIN
RAYMOND L. PLACEK
KENNETH DOW
BY
ATTORNEYS.

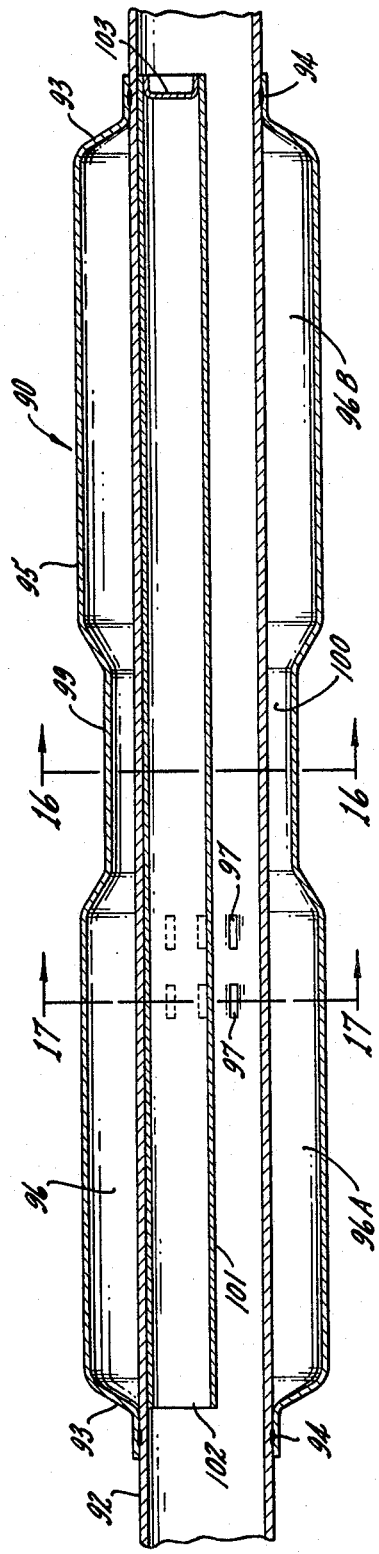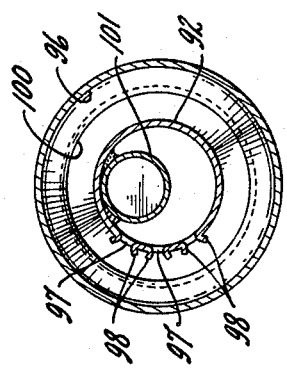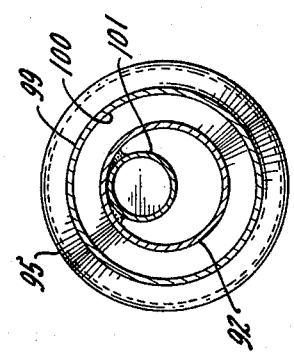

United States Patent Office 3,263,772
Patented August 2, 1966

3,263,772
SOUND ATTENUATING GAS CONDUIT WITH ONE-QUARTER WAVE-LENGTH SIDE BRANCH CHAMBERS
Benjamin H. Irwin, Raymond L. Placek, and Kenneth Dow, Columbus, Ind., assignors to Arvin Industries, Inc., Columbus, Ind., a corporation of Indiana
Filed June 17, 1964, Ser. No. 375,871
13 Claims. (Cl. 181—59)

This invention relates to a sound attenuating gas conduit for conveying, and attenuating the noise level of, a moving gas stream, and which is well adapted for use with an internal combustion engine for conveying the exhaust gases therefrom and silencing the noise level of said exhaust gases.

It is an object of the invention to provide such a sound attenuating gas conduit which will meet limited space requirements, which can be easily manufactured largely from inexpensive metal-tubing, and which can be of light-weight construction with its weight substantially uniformly distributed along its length. It is a further object of the invention to provide such a sound attenuating gas conduit which can be made to effect sound attenuation over a wide range of frequencies, which can be tuned to attenuate undesired frequencies, and which will remain substantially in tune with said frequencies irrespective of temperature changes in the gas stream in which the sound waves are carried. It is a further object of the invention to provide such a sound attenuating gas conduit which will be less susceptible to certain types of corrosion than conventional gas-silencing systems.

It is a special object of the invention to provide a sound attenuating gas conduit for the exhaust gas stream of an automotive vehicle, which will eliminate the need for the bulky, expensive, and troublesome mufflers which are required in conventional automotive exhaust silencing systems.

In accordance with one form of the invention as applied to an automotive exhaust system, the engine exhaust outlet is connected to a pipe to convey the exhaust gases to the desired discharge point, as at the rear of the vehicle. A first member is mounted on said pipe with portions thereof spaced from the outer pipe face to form a closed cavity which may be filled with a fibrous wadding. The pipe has a plurality of openings formed within it within the axial extent of said cavity for acoustically coupling the gas flow passage defined by the pipe with the cavity whereby said cavity will effect an attenuation of the relatively high frequency sound waves in the exhaust gases moving through the pipe.

A second member is mounted on the pipe with portions thereof spaced from the outer pipe face to form a closed second cavity. Throat-forming means are formed on the pipe within the axial extent of the second cavity and act in combination with said cavity to form a silencing element preferentially responsive to a given frequency and the odd number multiplies thereof. The axially intermediate portion of the throat-forming means is spaced from one end of the pipe a distance substantially equal to an odd number multiple of one-fourth of the wave length of said given frequency.

An elongated tube having one open end and one closed end is mounted within the pipe in a position such that it is within at least a portion of the axial extent of the throat-forming means formed in the pipe. The walls of said tube form a gas column within the pipe and the open end of said tube is spaced from one end of the pipe a distance substantially equal to an odd number multiple of the length of said gas column.

Other objects and features of the invention will become apparent from the more detailed description which follows and from the accompanying drawings, in which:

FIG. 1 is a fragmentary isometric view partially in section showing a sound attenuating exhaust system embodying the invention;

FIG. 2 is an enlarged fragmentary longitudinal section of the exhaust system shown in FIG. 1;

FIG. 3 is a transverse section taken on the line 3—3 of FIG. 2;

FIG. 4 is an enlarged fragmentary longitudinal section of another portion of the exhaust system shown in FIG. 1;

FIG. 5 is an enlarged transverse section taken on the line 5—5 of FIG. 4;

FIG. 6 is a fragmentary isometric view partially in section showing a modified form of the system shown in FIG. 1;

FIG. 7 is an enlarged transverse section taken on the line 7—7 of FIG. 6;

FIG. 8 is an enlarged transverse section taken on the line 8—8 of FIG. 6;

FIG. 9 is a fragmentary longitudinal section of the modified form of the silencing elements shown in FIGS. 4 and 8;

FIG. 10 is a fragmentary longitudinal section of a modified form of the silencing element shown in FIG. 4;

FIG. 15 is a fragmentary longitudinal section of a modified form of the silencing element shown in FIG. 4;

FIG. 16 is a transverse section taken on the line 16—16 of FIG. 15; and

FIG. 17 is a transverse section taken on the line 17—17 of FIG. 15.

Figure 11:
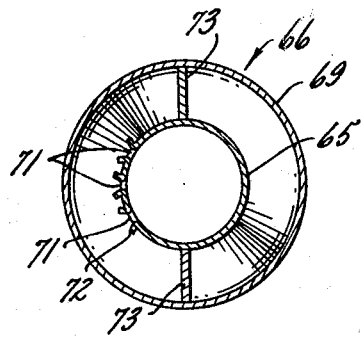
FIG. 11 is a transverse section taken on the line 11—11 of FIG. 10.

This invention is particularly well adapted for use with an internal combustion engine of an automobile to silence exhaust gases emanating from said engine and to convey them to a suitable discharge point. In such usage, it can completely replace a conventional exhaust system in which all of the silencing effect is lumped in a specific location determined by the structural requirements of the vehicle, as in a muffler connected between an exhaust pipe joined to the exhaust manifold of the engine and a tail pipe leading from the muffler to a gas discharge point.

The embodiment shown in FIG. 1 comprises a pipe 10 adapted to be connected at one end to an exhaust outlet 12, i.e. the manifold by a conventional mounting flange 14, with its opposite end open to the atmosphere. Conveniently, the pipe 10 may have the same outer diameter as the exhaust and tail pipes used in conventional exhaust systems. While the pipe 10 may be a unitary length, it may be formed from a plurality of short interconnected lengths of pipe as shown to facilitate the installation and replacement of the silencing elements.

In the exhaust system illustrated in FIG. 1, a high frequency silencing element 16 primarily adapted to silence sound waves having frequencies above 1500 cycles per second is mounted on the pipe 10. Said silencing element comprises an elongated sleeve 18 disposed around the pipe 10 with its ends 19 bent inwardly to abut the outer face of said pipe where they are secured to said pipe by welding, as at 20. The intermediate portion 21 of the sleeve 18 is spaced from the outer face of the pipe 10 to define an annular closed cavity 22 extending around said pipe. Desirably, the cavity 22 may remain empty or may be filled with a porous fibrous material 24, such as asbestos fibers, stainless steel wool, fiberglass, or the like. A plurality of openings 26 are formed in the pipe 10 acoustically coupling the cavity 22 to the sound waves in the gas stream moving through said pipe. Desirably, the openings 26 are formed by shearing the pipe 10 to provide tongues 28 bent to project out of the general plane of the pipe 10.

A second silencing element 30 is also mounted on the pipe 10. Said silencing element comprises an elongated sleeve 32 disposed around the pipe 10 with its ends 33 bent inwardly to abut the outer face of said pipe where they are secured to said pipe by welding, as at 34. The intermediate portion 35 of the sleeve 32 is spaced from the outer face of the pipe 10 to define an annular closed cavity 36 extending around said pipe. A plurality of throat-forming openings 38 are formed in the pipe 10 within the axial extent of the cavity 36 to dispose said cavity in operable acoustical communication with the sound waves in the gas stream moving through said pipe. Desirably, the openings 38 are formed by shearing the pipe 10 to provide tongues 40 projecting out of the general plane of the pipe 10.

The cavity 36, being acoustically coupled to the gas passage through the openings 38, defines a gas column having a length equal to the length of the cavity. The length of the gas column will, of course, be equal to one-fourth of the wave length for a given sound wave frequency and, according to known principles of acoustics, will thus make the silencing element 30, when it is properly coupled to the gas stream, preferentially responsive to attenuate that sound wave and the odd number multiples thereof. For example, if the gas column is 2 feet long, the silencing element will be preferentially responsive to the sound wave frequency having a length equal to 8 feet and to the sound wave frequencies which are odd number multiples of that frequency and whose wave lengths are thus equal to 2.66 feet, 1.6 feet, etc.

Said gas column acoustically coupled to the gas stream through the openings 38 will create a reflective impedance change in the sound waves moving down the pipe 10. When this impedance change is properly phased in the gas stream with respect to the frequencies for which the silencing element is preferentially responsive, it will effect an attenuation by cancellation. Therefore, to effect such attenuation, the intermediate portion of the openings 38 is axially spaced from the discharge end of the pipe 10 a distance equal to the odd number multiples of the length of the gas column formed by the cavity 36.

It is further believed that the silencing element 30 serves as a Helmholtz type resonator for effecting sound attenuation by storing the energy of the sound waves moving down the pipe 10. With the element 30 acting as a resonator, the cavity 36 constitutes the resonator volume. The tongues 40 of the openings 38 provide said openings with an effective length such that they increase the conductivity of said openings so that said openings function as a resonator throat. In this manner, the silencing element 30 can be tuned in the manner of a Helmholtz resonator by adjusting the conductivity of the throat-forming openings 38 by adjusting their cross-sectional extents and the lengths of their tongues 40. In such tuning, the frequency to which the silencing element is responsive is calculated according to the formula $$f = \frac{C}{2\pi}\sqrt{\frac{C_0}{V_c}}$$

where $f$ is the frequency to which the silencing element is to be tuned, $C$ is the speed of sound in inches per second at the temperature of the medium, $V_c$ is the capacity of the resonator volume, and $C_0$ is the conductivity of the resonator throat equal to $$\frac{2(\text{cross sectional area of the throat})}{2h + (\text{mean radius of the throat cross section})}$$

and $h$ is the length of the throat.

Further attenuation is effected by an elongated tube 45 having an open end 46 and a closed end 47. Desirably, the tube is mounted within the pipe 10 as by welding it to the inner face of said pipe at 48. The tube 45 forms a gas column within the pipe which will result in a reflective impedance change in said pipe preferentially responsive to the sound wave frequency having a length equal four times the length of the gas column formed by said tube and the frequencies which are odd number multiples of that frequency. In order to phase the impedance change of the tube 45 in the gas stream moving down the pipe 10 to effect attenuation by cancellation, the open end 46 of the tube is displaced from the discharge end of the pipe 10 a distance equal to an odd number multiple of the length of the gas column formed by said tube. Preferably, the tube is mounted in the pipe 10 in a position such that it is disposed within at least a portion of the axial extent of the openings 38 for the silencing element 30. With said tube being disposed within the axial extent of said openings, said tube reduces the cross-sectional area of the gas passage formed by the pipe 10 to more intimately couple said openings to the gas stream for increasing the efficiency of the silencing element 30.

A modified form of the exhaust system shown in FIG. 1 is illustrated in FIG. 6. The system shown in FIG. 6 comprises a pipe 10′ conveniently formed from a plurality of short interconnected lengths of pipe and adapted to be connected at one of its ends to an exhaust manifold 12′ through a conventional mounting flange 14′.

The system shown in FIG. 6 differs solely from the system shown in FIG. 1 in the construction of the members forming the cavities for the silencing elements. As shown, a high frequency silencing element 16′ is formed by a sheet-metal stamping having a centrally disposed concavity 50 formed therein. A peripherally extending flange 52 borders the concavity 50 and is rigidly secured to the outer face of the pipe 10 by welding, as at 53. In this manner, the concavity 50 and the portion of the outer face of the pipe extending thereunder define a cavity 22′ which is filled with a porous fibrous material 24′, such as asbestos fibers, stainless steel wool, fiberglass, or the like. A plurality of openings 26′ are formed in the pipe 10′ to acoustically couple the cavity 22′ with the sound waves in the gas stream moving through said pipe. Desirably, the openings 26′ are formed by shearing the pipe 10′ to provide tongues 28′ bent to project out of the general plane of said pipe.

A silencing element 30′ is also mounted on the pipe 10′ and is formed from a sheet-metal stamping having a centrally disposed concavity 54 formed therein. A peripherally extending flange 56 borders the concavity 54 and is secured to the outer face of the pipe 10′ by welding, as at 58. A plurality of opening 38′ are formed in the pipe 10′ to acoustically couple the cavity 36′ formed by the concavity 54 and the underlying portion of the pipe 10′ with the sound waves moving through said pipe. Desirably, the openings 38′ are formed by shearing the pipe 10′ to provide tongues 40′ bent to project out of the general plane of said pipe.

A tube 45′ having an open end 46′ and a closed end 47′ is mounted within the pipe by welding it to the inner pipe face, as at 48′. The tube 45′ is mounted within the pipe 10′ to dispose its open end 46′ at a distance from the discharge end of the pipe 10′ equal to an odd number multiple of the length of the gas column defined by said tube. As with the system shown in FIG. 1, it is desirable that the tube 45′ be disposed within the pipe 10′ in a position such that it lies within the axial extent of at least a portion of the openings 38′.

When either end of the tube 45 or 45′ is disposed adjacent the throat-forming openings 38 or 38′, it creates an impedance change adjacent said openings to render the silencing element 30 or 30′ more effective. However, because of the irregular contours of the pipe upon which the several silencing elements are mounted, it may not be possible to dispose the tube 45 or 45′ immediately adjacent the openings 38 or 38′. Therefore, as shown in FIG. 9, the pipe 10 may be ringed inwardly, as at 60, immediately adjacent the openings 38 to create a change in the cross-sectional area of the gas passage immediately adjacent said openings. This change in the cross-sectional area of the gas passage immediately adjacent the openings 38 causes an impedance change in the gas stream in substantially the same manner as if one end of the tube 45 or 45′ was disposed adjacent said openings. As will be understood, the pipe 10′ may also be ringed inwardly adjacent the openings 38′ in situations where it is not possible to mount one end of the tube 45′ immediately adjacent said openings.

The frequency responses of the silencing elements 30 and 30′ in creating an interference or impedance pattern in the sound waves moving down the pipe are primarily a function of the length of the gas columns formed by the cavities 36 and 36′. The sound waves for the lower frequencies are extremely long in length, thereby necessitating that the gas columns formed by the cavities 36 and 36′ be relatively long to attenuate these lower frequencies. However, because of the number of bends and contours that must be formed in the conduit, the axial length of the silencing elements may, in certain instances, be limited. The silencing elements shown in FIGS. 10–14 provide gas columns provided with closed ends and of substantial length without increasing the overall axial length of the silencing elements. For example, the silencing element shown in FIG. 10 provides a gas column having an effective length substantially twice the length of the silencing element, and the structure shown in FIG. 12 provides a gas column having a length substantially three times the length of the silencing element.

Figure 12:
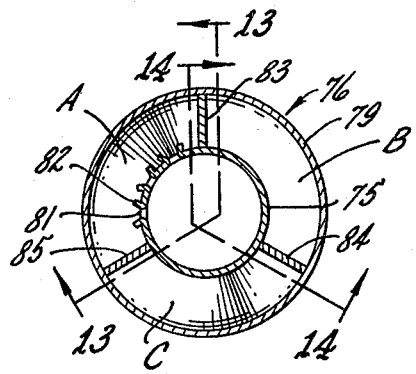
FIG. 12 is a transverse section of a modified form of the silencing element shown in FIG. 10.

The structure shown in FIGS. 10 and 11 comprises a silencing element mounted on a pipe 65 forming a gas-flow passage. Said silencing element comprises a sleeve 66 disposed around the pipe 65 with its ends 67 abutting the outer face of said pipe and connected thereto by welding, as at 68. The intermediate portion 69 of the sleeve 66 is spaced from the outer face of the pipe 65 to define a closed cavity 70 interposed between the outer face of said pipe and the sleeve. A plurality of openings 71 are formed in the pipe 65 within the axial extent of the cavity 70 and adjacent one end thereof for acoustically coupling said cavity to the gas stream flowing through the pipe 65. The openings 71 may be formed by shearing the pipe 65 to provide tongues 72 bent to project out of the general plane of the pipe 65.

In order to elongate the gas column formed by the cavity 70, a pair of plates 73 are carried within the cavity 70 and extend between the pipe 65 and the adjacent wall of the sleeve 66. As shown in FIG. 10, one end of the plates 73 abuts the adjacent end 67 of the sleeve 66. The opposite ends of the plates 73 are spaced from the opposite end of the sleeve 66, as at 74. In this manner, the plates 73 divide the cavity 70 into a pair of axially extending compartments in open communication with each other at the end of the cavity remote from the openings 71 to provide a closed end retroverted gas column within said cavity having an overall length approximately twice the axial length of said cavity.

Figure 13:
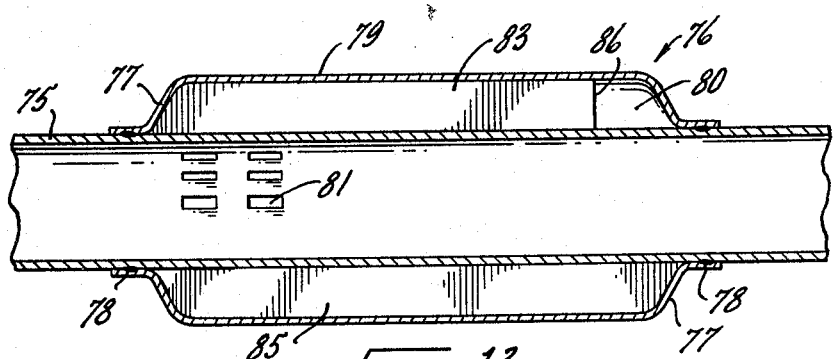
FIG. 13 is a longitudinal section taken on the line 13—13 of FIG. 12.
Figure 14:
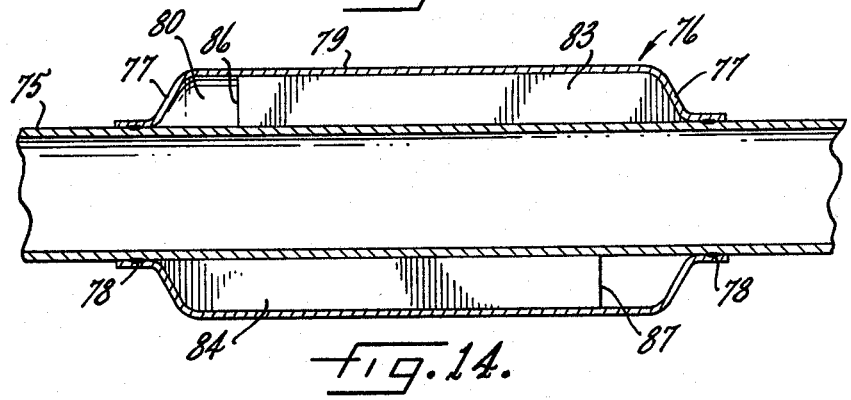
FIG. 14 is a longitudinal section taken on the line 14—14 of FIG. 12.

The embodiment shown in FIGS. 12–14 is similar to the embodiment shown in FIGS. 10 and 11, and provides a retroverted gas column having a length approximately three times the length of the silencing element cavity. As shown, the silencing element is mounted on a pipe 75 forming a gas-flow passage. Said silencing element comprises a sleeve 76 disposed around the pipe 75 with its ends 77 connected to said pipe by welding, as at 78. The intermediate portion 79 of the sleeve 76 is spaced from the outer face of the pipe 75 to define an elongated cavity 80 acoustically coupled to the gas passage by a plurality of openings 81 formed in the pipe 75 adjacent one end of said cavity. The openings 81 may be formed by shearing the pipe 10 to provide tongues 82 bent to project out of the general plane of said pipe.

In order to provide a retroverted gas column within the cavity 80, a plurality of elongated plates 83, 84, and 85 are mounted within the cavity 80 with their opposed edges connected to the adjacent faces of the pipe 75 and sleeve 76. As shown in FIGS. 13 and 14, the plate 85 extends the full length of the sleeve 76 and abuts the opposed ends 77 thereof. The plate 83 abuts the sleeve end wall adjacent the openings 81, but has its opposite end spaced from the opposite end of the sleeve, as at 86. Conversely, the plate 84 abuts the end of the sleeve 76 remote from the openings 81, and has its opposite end spaced from the end of the sleeve adjacent said openings, as at 87. The plates 83 and 85 act in combination with each other to define a first chamber A. The plates 83 and 84 act in combination with each other to define a second chamber B. And the plates 84 and 85 act in combination with each other to define a third chamber C. With the plate 83 being spaced from the sleeve end wall, as at 86, the chambers A and B will be in open communication with each other, and the chambers B and C will be in open communication with each other by the plate 84 being spaced from the sleeve end wall, as at 87. In this manner, the chambers A, B and C form a closed end retroverted gas column having a length approximately three times the length of the silencing element so that said silencing element has a preferential frequency response for the sound wave frequency having a length equal four times the length of the gas column and the frequencies equal to the odd number multiples of that frequency, as contrasted to a preferential frequency response for the sound wave frequency, and the odd number multiples thereof, having a length equal to four times the length of the silencing element, if the plates 83–85 were not present.

While the embodiments shown in FIGS. 10 and 12 are directed to structures for providing gas columns having effective lengths two and three times, respectively, the lengths of their respective silencing elements, it is to be understood, of course, that additional plates may be interposed in the silencing element cavities for increasing the number of retroversions within a silencing element cavity for further increasing the length of the gas column within said cavity with respect to the overall length of said cavity.

As with the silencing elements 30 and 30′, if the silencing elements shown in FIGS. 10 and 12 are to be employed for effecting attenuation by creating a reflective impedance change or cancellation in the sound waves moving down the gas passage they must be properly located with respect to said gas passage. To this end, the intermediate portions of the openings 71 and 81 are located a distance equal to the odd number multiples of the lengths of the gas columns of their respective silencing elements.

In the embodiment shown in FIGS. 15–17, an elongated sleeve 90 is disposed around a pipe 92 forming a gas-flow passage. The ends 93 of the sleeve 90 are bent inwardly to abut the outer face of said pipe where they are secured to said pipe by welding, as at 94. The intermediate portion 95 of the sleeve 90 is spaced from the outer pipe face to define an annular closed cavity 96 extending around said pipe. A plurality of openings 97 are formed in the pipe 92 to form a throat acoustically coupling the cavity 96 to the sound waves moving through said pipe. Desirably, the openings 97 are formed by shearing the pipe to provide tongues 98 bent to project out of the general plane of the pipe.

The intermediate sleeve portion 95 is deformed inwardly toward the pipe 92 adjacent one end of the openings 97, as at 99, and divides the cavity 96 into a sub-cavity 96A within the axial extent of the openings 97 and sub-cavity 96B outside the axial extent of said openings. The space between the pipe 92 and deformed sleeve portion 99 acts in combination with the openings 97 to form an elongated annular throat 100 acoustically coupling the cavity 96B to the gas stream. The throat 100 will have a lower conductivity than the openings 97 alone to give the sub-cavity 96B a lower frequency response than the cavity 96A.

If the sub-cavity 96A is to be employed for effecting attenuation by creating a reflective impedance change or cancellation in the sound waves moving down the pipe 92, it must be properly located with respect to said pipe. In such instance, the intermediate portions of the openings 97 are located a distance equal to the odd number multiples of the length of the gas column when formed by the sub-cavity 96A.

As with the embodiments in FIGS. 4 and 8, an elongated tube 101 having an open end 102 and closed end 103 may be welded to the inner face of the pipe 92. Said tube forms an impedance change in the same manner as the tubes 45 and 45' and is located within the pipe 92 to effect attenuation by phase cancellation like the tubes 45 and 45'. Preferably, at least a portion of the tube 101 is within the axial extent of the openings 97 to more intimately couple said openings to the gas stream.

As previously stated, the silencing element 30, and thus the silencing element 30' and the silencing elements shown in FIGS. 10, 12, and 15 also function as Helmholtz resonators to effect attenuation. Where this type of attenuation is desired, the throat-forming openings for the silencing elements should be coupled to the gas stream at the points of maximum sound pressure for the frequencies to which the silencing elements are tuned. In such usage, the silencing elements are normally tuned to attenuate the objectionable harmonics in the gas in the conduit by adjusting the volumetric capacities of the cavities and the conductivities of their throat-forming openings. Each harmonic will have specifically located maximum sound pressure points along the length of the main gas-flow passage (pipe) and spaced from an end of said pipe by fractions L of the pipe length according to the formula $$L = \frac{2m-1}{2n}$$

where $n$ is the harmonic number for which the silencing element is tuned, and $m$ is every integer between and including 1 and $n$. Thus, if a particular silencing element is tuned to attenuate the frequency of the second harmonic, the above formula can be employed to determine that the throat-forming openings for the silencing element be spaced from one end of the pipe by a distance equal to one-fourth or three-fourths of the length of said pipe.

We claim:

1. In a sound attenuating gas conduit, a pipe forming a main gas-flow passage, a member mounted on the pipe and having portions thereof spaced from the outer face of the pipe to form with the outer pipe face a closed cavity, said pipe having throat-forming means within the extent of said cavity whereby said throat-forming means and cavity form a silencing element acoustically connected to said gas-flow passage, the intermediate portion of said throat-forming means being spaced from one end of said pipe a distance substantially equal to an odd number multiple of the length of said cavity, and an elongated tube having one open end and once closed end carried within said pipe within at least a portion of the axial extent of said throat-forming means.

2. The invention as set forth in claim 1 in which said throat-forming means comprise a plurality of axially and circumferentially spaced openings formed in said pipe, the portions of the pipe defining the edges of said openings being deformed out of the general plane of said pipe.

3. The invention as set forth in claim 1 in which the walls of said tube define a gas column within said pipe, and the open end of said tube is spaced from one end of said pipe a distance substantially equal to an odd number multiple of the length of said gas column.

4. In a sound attenuating gas conduit, a pipe forming a main gas-flow passage, said pipe having throat-forming means formed therein, a member mounted on the pipe within the axial extent of said throat-forming means and having portions thereof spaced from the outer face of the pipe to provide a closed cavity in the form of a gas column connected to said gas-flow passage through said throat-forming means, the axially intermediate portion of said throat-forming means being spaced from one end of said pipe a distance substantially equal to an odd number multiple of the length of said gas column, and means forming an impedance change within said gas-flow passage immediately adjacent said throat-forming means.

5. The invention as set forth in claim 4 in which said member comprises a sleeve disposed around said pipe with its end portions abutting the outer pipe face and its intermediate portion spaced from said face to form an annular cavity around said pipe.

6. The invention as set forth in claim 4 in which said member comprises a sheet-metal member having a concavity formed therein and spaced from said pipe, and a flange extending around said concavity and rigidly secured to said pipe.

7. The invention as set forth in claim 4 in which a plurality of plates are carried within said cavity and extend between said pipe and said portions of said member spaced from said pipe to form a closed end retroverted gas column within said cavity.

8. The invention as set forth in claim 4 in which said means comprises a deformation in said pipe forming a change in cross-sectional area of said gas-flow passage.

9. The invention as set forth in claim 4 with the addition that means are provided to divide said cavity into a first sub-cavity within the axial extent of said throat-forming means and a second sub-cavity outside the axial extent of said throat-forming means, said means acting in combination with said pipe and throat-forming means to form an elongated throat acoustically coupling said second sub-cavity to the gas-flow passage.

10. The invention as set forth in claim 4 in which said member has means dividing said cavity into a pair of sub-cavities and acting in combination with said pipe to form an elongated throat between said sub-cavities, said throat-forming means in said pipe being within the extent of one of said sub-cavities for acoustically coupling one of said sub-cavities directly to the gas stream and for acoustically coupling the oher of said pair of cavities to the gas stream through said elongated throat.

11. In a sound attenuating gas conduit, a pipe forming a main gas-flow passage, a member mounted on the pipe and having portions thereof spaced from the outer face of the pipe to form with the outer pipe face a closed cavity, means dividing said cavity in a pair of sub-cavities, and acting in combination with said pipe to form an elongated throat, said pipe having a plurality of openings formed therein within the extent of one of said sub-cavities for acoustically coupling one of said sub-cavities directly to the gas stream and for acoustically coupling the other of said pair of cavities to the gas stream through said elongated throat, and an elongated tube having one open end and one closed end carried within said pipe within at least a portion of the axial extent of said openings.

12. In an exhaust system for an internal combustion engine, an open-ended pipe for connection to the engine to form a gas-flow passage for receiving the exhaust gases from said engine and conveying them to a discharge point, a first member mounted on said pipe and having portions thereof spaced from the outer face of said pipe to form a closed first cavity, a fibrous wadding carried in said first cavity, said pipe having a plurality of first openings formed therein within the extent of said first cavity acoustically connecting the first cavity to the gas-flow passage, a second member mounted on said pipe and having portions thereof spaced from the outer face of said pipe to define a closed second cavity in the form of a gas column, said pipe having a plurality of second openings formed therein within the axial extent of said second cavity acoustically connecting the second cavity to the gas-flow passage, said second openings and second cavity forming a silencing element being preferentially responsive to a plurality of frequencies, the axially intermediate portion of said second openings being spaced from one end of said pipe a distance substantially equal to an odd number multiple of the length of said gas column, and an elongated tube having an open end and a closed end mounted within said pipe, said tube being spaced from the discharge end of said pipe a distance substantially equal to an odd number multiple of the length of said tube.

13. In an exhaust silencing system for an internal combustion engine, comprising an open ended pipe for connection to the engine to receive the exhaust gases thereof and to convey such gases to a discharge point, said pipe forming a gas conduit wherein the exhaust sound produces one or more distinct harmonic sound-pressure points at particular locations along the length of the conduit according to the formula $$L = \frac{2m-1}{2n}$$

where $n$ is a harmonic number and $m$ is any integer between and including 1 and $n$, a first member mounted on said pipe and having portions thereof spaced from the outer face of the pipe to form a closed first cavity, a fibrous wadding carried in said first cavity, said pipe having a plurality of first openings formed therein within the extent of said first cavity acoustically connecting said first cavity and gas-flow passage, a second member mounted on said pipe and having portions thereof spaced from the outer face of said pipe to form a closed second cavity, said pipe having a plurality of second openings formed therein within the axial extent of said second cavity acoustically connecting said second cavity and gas-flow passage, said second openings and second cavity forming a silencing element having a preferential response to a sound frequency producing one or more of said pressure points, said second openings being adjacent one of the pressure points of the frequency to which said silencing element is preferentially responsive, and an elongated tube having an open end and a closed end mounted within said pipe to form a closed end gas column, said tube being spaced from the discharge end of said pipe a distance substantially equal to an odd number multiple of the length of said gas column.

References Cited by the Examiner

UNITED STATES PATENTS

| | | | |
|---|---|---|---|
| 1,910,672 | 5/1933 | Bourne | 181—48 |
| 2,297,046 | 9/1942 | Bourne | 181—35 |
| 2,332,543 | 10/1943 | Wilson | 181—48 |
| 2,808,896 | 10/1957 | Wilman. | |
| 3,036,654 | 5/1962 | Powers | 181—35 |
| 3,104,735 | 9/1963 | Ludlow et al. | 181—36 |
| 3,112,007 | 11/1963 | Ludlow et al. | 181—59 |
| 3,119,459 | 1/1964 | Ludlow et al. | 181—36 |
| 3,146,850 | 9/1964 | Ludlow et al. | 181—36 |
| 3,209,861 | 10/1965 | Whitney | 181—59 |
| 3,212,603 | 10/1965 | Walker | 181—61 X |

FOREIGN PATENTS

| | | |
|---|---|---|
| 742,529 | 12/1955 | Great Britain. |
| 167,485 | 6/1959 | Sweden. |

LOUIS J. CAPOZI, *Primary Examiner.*

LEO SMILOW, *Examiner.*

ROBERT S. WARD, *Assistant Examiner.*